United States Patent [19]

Mohn et al.

[11] 4,275,807
[45] Jun. 30, 1981

[54] SUPPORT FOR ROTATABLE PLATFORMS FOR BOTTLES

[75] Inventors: Hans-Werner Mohn, Kaarst; Rainer Buchholz, Dusseldorf; Egon Höveler, Haan; Rudolf Zodrow, Dusseldorf, all of Fed. Rep. of Germany

[73] Assignee: Jagenberg-Werke AG, Dusseldorf, Fed. Rep. of Germany

[21] Appl. No.: 59,862

[22] Filed: Jul. 23, 1979

[30] Foreign Application Priority Data

Jul. 26, 1978 [DE] Fed. Rep. of Germany ....... 2832778

[51] Int. Cl.³ .............................................. B65C 9/04
[52] U.S. Cl. ........................... 198/344; 156/DIG. 26; 198/377; 198/478; 198/500
[58] Field of Search ............... 198/344, 377, 478, 480, 198/500; 156/567, 571, DIG. 13, DIG. 26

[56] References Cited

FOREIGN PATENT DOCUMENTS 1258784 1/1968 Fed. Rep. of Germany .

*Primary Examiner*—Jeffrey V. Nase
*Attorney, Agent, or Firm*—Sprung, Felfe, Horn, Lynch & Kramer

[57] ABSTRACT

A support having a plurality of circularly arranged rotatable platforms for bottles includes a drive mechanism having a plane stationary cam plate and sensing elements for each platform in contact with the cam plate. The drive mechanism is mounted in the support and configured such that the same lever arm, sensing element and platform drive shaft can be utilized for both counterclockwise and clockwise rotation of the platform merely by the angular orientation of the drive mechanism with respect to the cam plate.

5 Claims, 6 Drawing Figures

SUPPORT FOR ROTATABLE PLATFORMS FOR BOTTLES

BACKGROUND OF THE INVENTION

The present invention relates to a support fitted with several circularly arranged, sensor-controlled rotatable platforms for bottles, which is rotated by a drive mechanism and with which a plane, stationary, preferably closed cam is associated which is made contact with by sensors of the platforms, said sensors rotating the platforms forward and backward via cam-guided lever arms and gears with pinions mounted on the shafts of the rotatable platforms.

In a known device for rotating platforms for bottles the shaft of each platform is engaged by a lever arm which is guided directly in a plane cam. Such a rotary control with cam-guided lever arms makes possible a range of rotation of the platform of about 90°. Greater ranges of rotation with this kind of rotary control would result in excessive stress on the cam and drive mechanism.

In a more advanced version of this known device, the range of rotation of the platforms is increased by mounting a gear between the lever arm and drive shaft consisting of a pinion mounted on the drive shaft and a toothed segment which is engaged by a cam-guided lever arm. Based on the transmission ratio between pinion and toothed segment, a range of rotation of up to 270° can be achieved with this slow guidance of the lever arm.

In both of the above described devices, the rotatable platforms are mounted directly in the support. With the platforms with gears, the shafts of the platforms and the toothed segments are separately mounted. Because of the required slow guidance of the lever, this construction necessitated for a clockwise rotation a different arrangement of the mountings for platform shaft and pinion than for a counter-clockwise rotation.

SUMMARY OF THE INVENTION

The object of the invention is to enable a simpler clockwise and counter-clockwise rotation with a support of the aforementioned kind.

This object is achieved in that with the pinion meshes a gear on which the lever arm is fastened.

The invention thus makes it possible to use the same support for both clockwise and counter-clockwise rotation. To switch from clockwise to counter-clockwise rotation, the lever arm merely has to be pivoted 180°. The gear meshing with the pinion makes possible such a movement. From a gear technology point of view, this use of a pinion and gear according to the present invention does not require much greater effort than the use of a pinion and toothed segment according to the prior art. Use of this pinion and gear arrangement, on the other hand, has the surprising effect of dispensing with the requirement of changing the support when switching from clockwise to counter-clockwise rotation.

According to a further perfection of the invention, absolutely symmetrical conditions with clockwise and counterclockwise operation as well as the most compact arrangement possible (narrow spacings on the support) can be achieved by mounting each platform with its lever arm and sensing element in a cup-shaped housing frame and providing mounting means in the support for each housing frame into which the said housing frame can be locked in a position as determined by stops, locks or the like, the axis of the lever arm and the axis of the rotatable platform in the circumferential direction of the support being arranged on opposite sides eccentrically to the axis of the cup-shaped housing frame and the cam for clockwise rotation to a mirror image cam for counter-clockwise rotation being shifted by double the sum of the eccentric shifts of lever arm axis and platform axis in the circumferential direction of the support.

With such a perfection of the invention, absolutely mirror-like movement cycles relative to a fixed point lying outside the support are achieved for clockwise and counter-clockwise rotation. Such conditions may be required, for example, with machines working in parallel operation, with the operator standing between two rotatable platforms to monitor the process.

According to an alternative version for absolutely symmetrical conditions for clockwise and counter-clockwise rotation, each rotatable platform with its lever arm and sensing element can be mounted inside a cup-shaped housing frame, the support having a mounting means for each housing frame into which the latter can be clamped by way of stops, locks or the like into two positions shifted 180° relative to each other for a clockwise or counter-clockwise operation of the support. Preferably, the axis of the housing frame is eccentric to the axis of the rotatable platform. Where the drive is effected over gears, the axis of the housing frame will preferably lie between the platform axis and the lever arm axis. With such an embodiment of the invention which is not restricted to a drive with pinion and gear but is applicable also to a simple lever control, the cams for clockwise and counter-clockwise operation are mirror images relative to a plane lying outside the cams and parallel to the axis of the support.

The advantage of a mounting in a housing frame and the corresponding position of the cam lies, however, not only in the symmetry of movements of the platforms but also in the fact that the rotatable platform together with its drive mechanism can be replaced as one unit. This increases each of repair since the rotatable platform together with the drive mechanism can be exchanged even by unskilled persons. In addition, such compact units can be used also on supports having diverse spacing arrangements.

If the rotatable platform shaft with its drive is mounted inside a housing frame, a central lubrication of the bearings for the platform shaft, lever arm, and possibly pinion shaft and sensing roll and gears can be realized by providing a lubricant feed leading to the inside of the housing frame and connecting the various outer lubrication points like bearings of the platform shaft, lever arm and sensing rolls via channels in the shaft or shafts and the lever arm, and further providing outlet holes on the guide rolls for lubrication of the cam plates.

The invention is more fully explained in the following with respect to the embodiments shown in the drawings, wherein

DETAILED DESCRIPTION OF THE INVENTION

Figure 1:
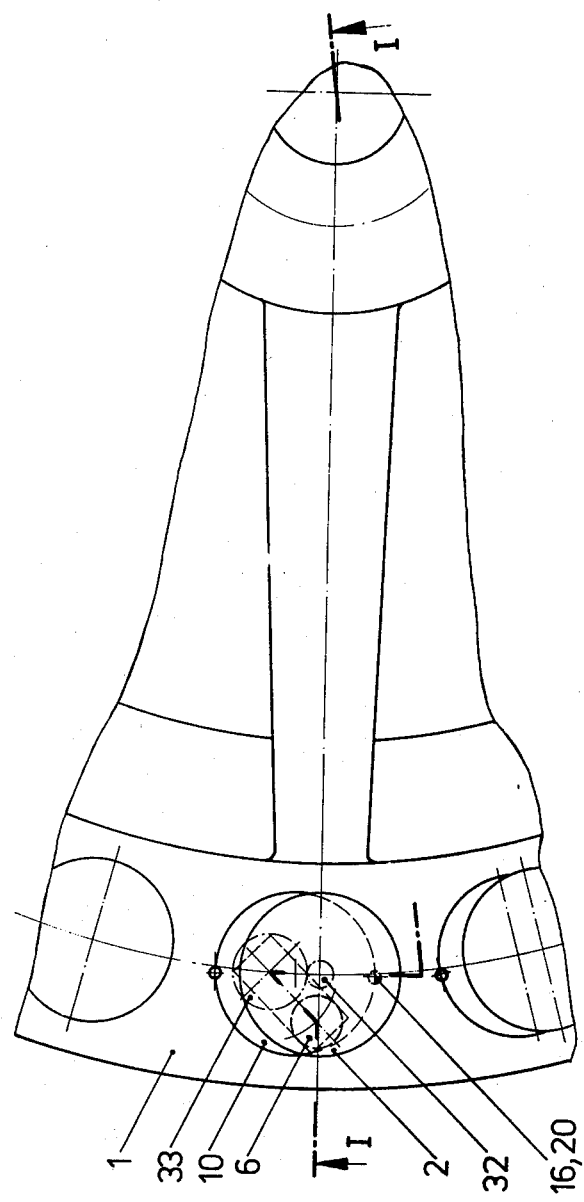
FIG. 1 shows a section of a support with circularly arranged rotatable platforms in top view.
Figure 2:
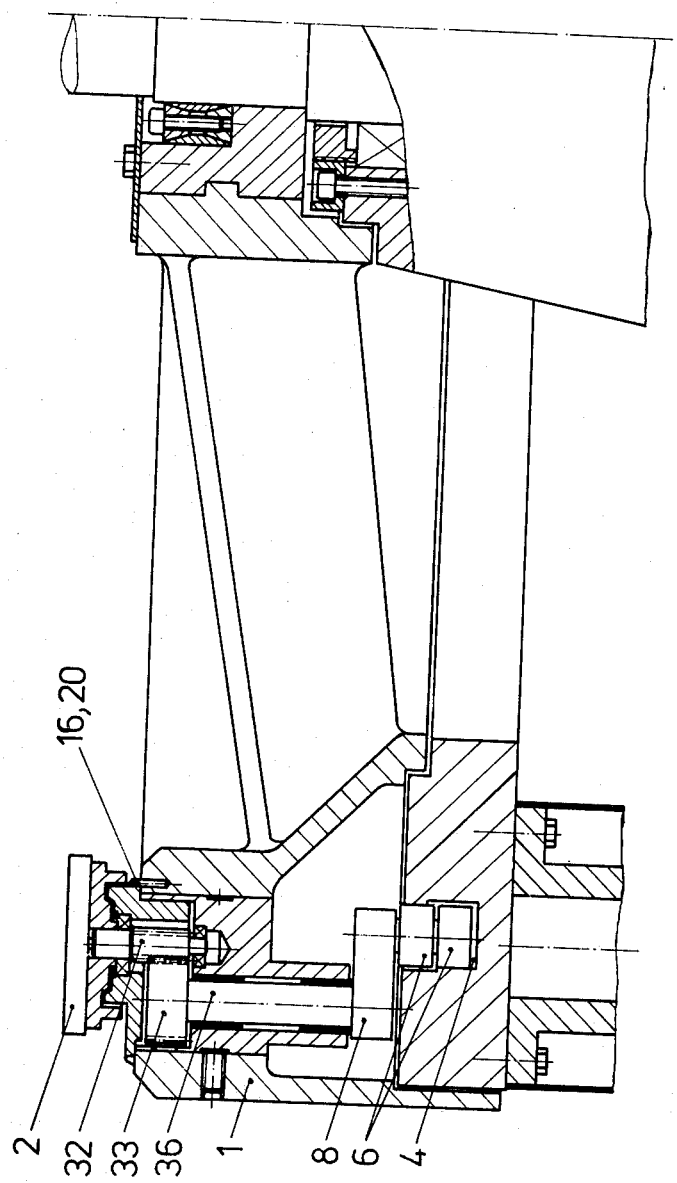
FIG. 2 shows the support of FIG. 1 in axial section along line I—I of FIG. 1.

The support 1 shown in FIG. 1 has a dishlike configuration and is set in rotation by a drive mechanism not shown in the figure. In its marginal area, support 1 carries a number of circularly arranged rotatable platforms 2, 3. Each platform 2, 3 has its own drive mechanism consisting of a stationary plane cam 4, 5 and a lever arm 8, 9 pivoted by sensing rolls 6, 7. Cam 4, 5 is immovably mounted.

During their movement in a circular path as given by the support 1, the bottles placed on platforms 2 with their labels already slightly attached are automatically turned about their own axes so that means mounted on the path can press on the labels smoothly against the bottles. Depending on the type of label to be attached, this rotation will be 90° and more. Usually, two such supports operate in parallel, viz. one in clockwise and one in counter-clockwise rotation. It is generally desirable that the movements of the individual bottles relative to a central point lying between the supports by absolutely symmetrical.

Each rotatable platform 2, 3 coated with a material of a high friction value is mounted in a substantially cylindrical housing frame 10, 11. The housing frame 10, 11 is inserted in a corresponding mounting means 12, 13 in support 1. The housing frame 10, 11 has an upper collar 14, 15 in the periphery of which notches 16, 17, 18, 19 shifted 180° are provided. By means of a pin 20, 21 disposed inside support 1, which engages one of the notches 16 through 19, housing frame 10, 11 is secured against distortion. In axial direction, the housing frame 10, 11 is secured by collar 14, 15 resting on the support 1 as well as by a screw bolt 24, 25 disposed in support 1 and engaging in an outer annular groove 22, 23 of housing frame 10, 11.

The rotatable platform 2, 3 rests on a drive shaft 26, 27 which with bearings 28, 29, 30, 31 is rotatably mounted in housing frame 10, 11. In the embodiment according to FIG. 3, a pinion 32 is mounted on drive shaft 26 which meshes with a gear 33. Gear 33 rests on a shaft 36 mounted with bearings 34, 35 in housing frame 10, at the protruding end of which a lever arm 8 is fastened. The center of housing frame 10 lies roughly midway between the axes of pinion 32 and gear 33.

Figure 4:
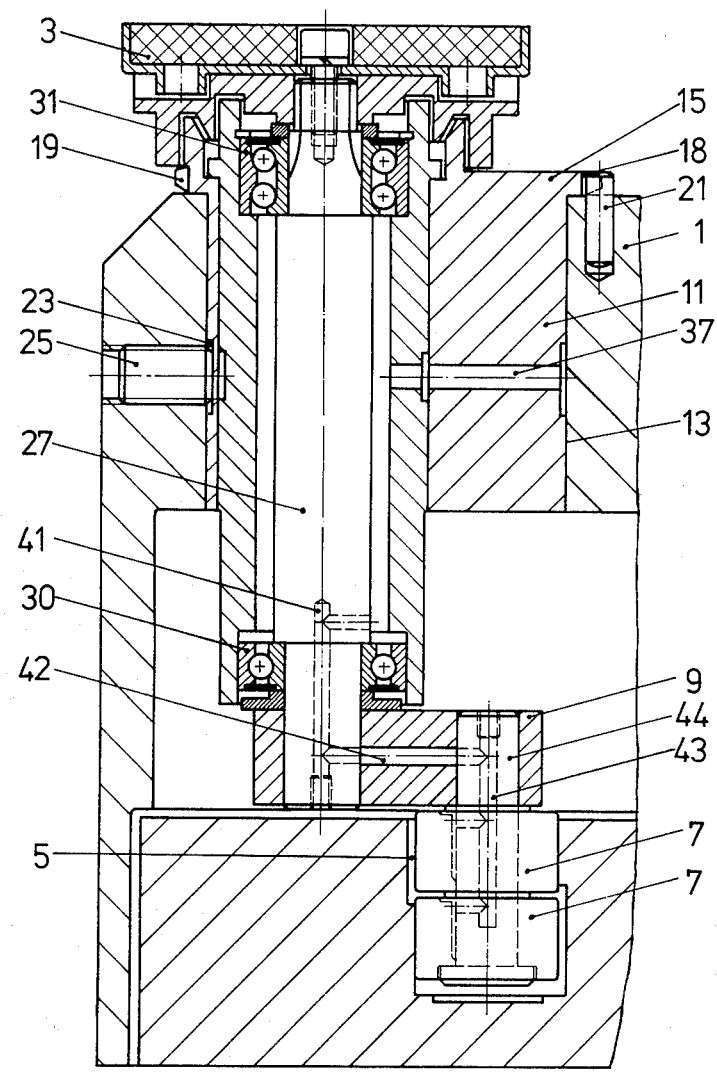
FIG. 4 shows a rotatable platform with drive in a modified design to FIG. 2.

In the embodiment of FIG. 4, lever arm 9 engages directly at the protruding end of drive shaft 27. The axis of drive shaft 27 is mounted eccentrically to the center of the housing frame.

In both embodiments, the lever arm 8, 9 including the guide rolls 6, 7 can be pivoted into a position lying within the cylinder circumscribed by housing frame 10, 11. It is thus made possible to pull the complete unit out of support 1, without requiring the dismantling of any parts thereof.

Both embodiments have central lubrication systems. To that end, a radial channel 46, 37 leading into the inside of the housing frame is provided in housing frame 10, 11. The points of lubrication accessible from or lying inside the housing frame, such as the bearings 28, 29, 30, 31, 34, 35 and pinion 32 and gear 33 are thus provided with lubricant. Lubrication of sensing rolls 6, 7 takes place via radial and axial channels 38, 39, 40, 41, 42, 43 in shafts 27, 36, lever arms 8, 9 and bearing segments 44, 45 for sensing rolls 6, 7. The bearings 28, 34 lying inside the housing frame are not sealed off, whereas the bearings 29, 35 are sealed off toward the outside so that lubricant from inside the housing frame can get to the various bearings, but not to the outside. In the embodiment according to FIG. 4, the two bearings 30, 31 are likewise sealed off from the outside so that no lubricant can escape to the outside from the housing frame. Lubricant can escape only via the unsealed rolls 44, 45 to the outside so that it lubricates the cams 4, 5.

Figure 3:
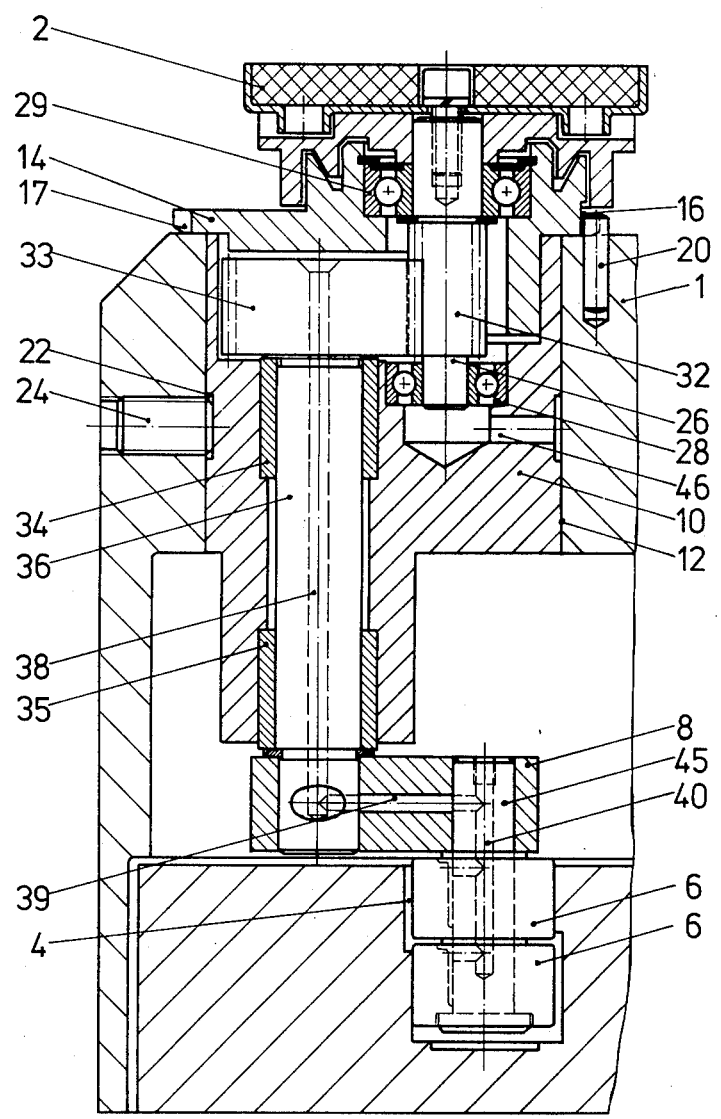
FIG. 3 shows an enlarged sectional view of the rotatable platform with drive according to FIG. 2.
Figure 5:
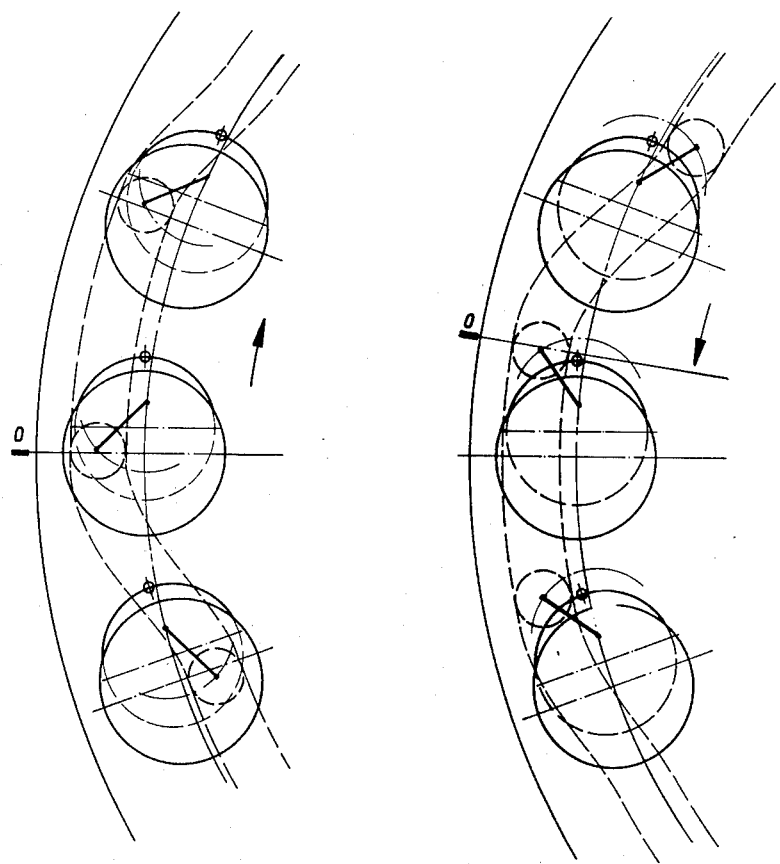
FIG. 5 shows a section of the support fitted with rotatable platforms according to FIG. 3, on the left for clockwise and on the right for counter-clockwise rotation
Figure 6:
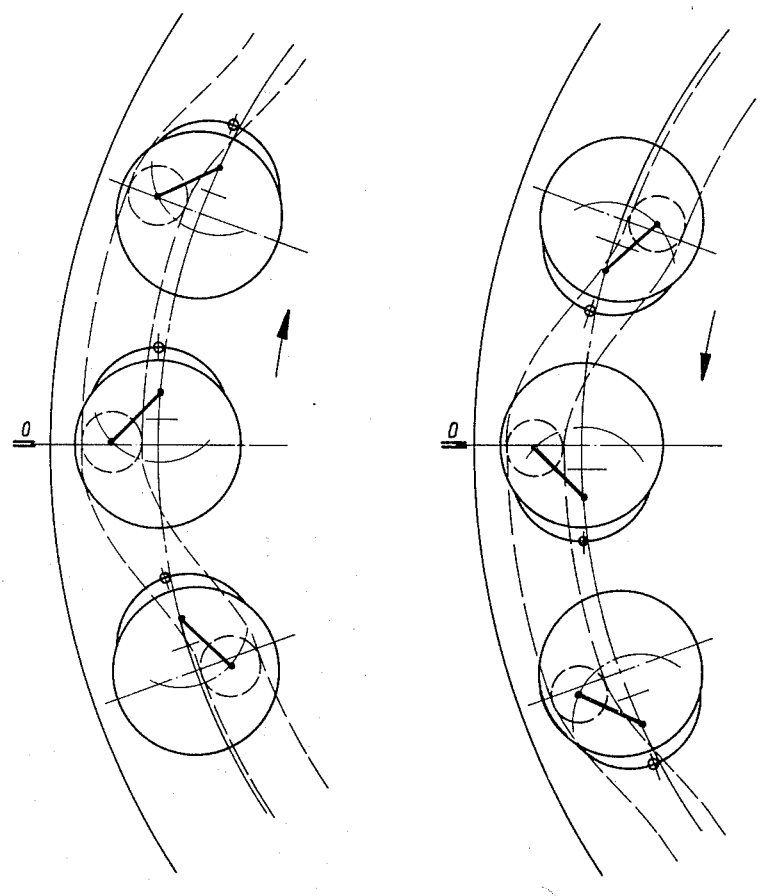
FIG. 6 shows a section of the support fitted with rotatable platforms according to FIG. 4, on the left for clockwise and on the right for counter-clockwise rotation.

To change the machine from clockwise to counter-clockwise operation, the rotation conditions being symmetrical, the lever arm 8 with a support 1 fitted with the units of FIG. 3 is pivoted 180° and a cam plate used which is the mirror image of the cam plate for clockwise operation and is shifted by double the sum of the distances of lever arm axis and rotatable platform axis to housing frame axis. FIG. 5 shows this schematically. To change a machine, whose rotatable platforms are equipped with the units according to FIG. 4, from clockwise to counter-clockwise operation, the complete unit is pivoted 180° in the support. In this case, the cam has merely to be replaced with a mirror image cam. These conditions are illustrated in FIG. 6.

We claim:

1. In a support having a plurality of circularly arranged rotatable platforms for bottles and a drive mechanism having a plane stationary cam plate and sensing elements for each platform in contact with the cam plate, the improvement wherein the drive mechanism further comprises for each platform: a lever arm coupled to the sensing elements and pivoted thereby, a platform drive shaft having the platform mounted thereon and having a pinion thereon, a gear in engagement with the pinion and driven by the lever arm and means mounting the platform, lever arm, drive shaft and gear to permit 180° angular displacement of the lever arm and gear with respect to the pinion so that clockwise and counter-clockwise rotation of the platforms is possible.

2. The support according to claim 1, wherein the mounting means comprises a cup-shaped housing frame and means for receiving said housing frame to lock same in a desired angular position and wherein the axis of the lever arm and the axis of the rotatable platform in the circumferential direction of the support are arranged on opposite sides eccentrically to the axis of the cup-shaped housing frame and the cam plate for clockwise rotation of the platforms is shifted to a mirror image cam plate for counter-clockwise rotation by double the sum of the eccentric shifts of the axis of the lever arm and the axis of the rotatable platform in the circumferential direction of the support.

3. The support according to claim 2, further comprising means for effecting common lubricant delivery to the inside of each housing frame comprising communicating channels in the lever arm, gear and sensing elements, with outlet holes at the sensing elements to effect lubrication of the cam plate.

4. In a support having a plurality of circularly arranged rotatable platforms for bottles and a drive mechanism having a plane stationary cam plate and sensing elements for each platform in contact with the cam plate, the improvement wherein the drive mechanism further comprises for each platform: a lever arm coupled to the sensing elements and pivoted thereby, a platform drive shaft having the platform mounted thereon and being driven by the level arm, means mounting the platform, lever arm, drive shaft and sensing element in a cup-shaped housing frame and means receptive of the frame to fix same in position in the support in one of two 180° angular displaced orientations so that clockwise and counter-clockwise rotation of the platforms is possible.

5. The support according to claim 4, further comprising means for effecting common lubricant delivery to the inside of each housing frame comprising communicating channels in the drive shaft lever arm and sensing elements, with outlet holes at the sensing elements to effect lubrication of the cam plate.

* * * * *